(12) United States Patent
Knapp

(10) Patent No.: US 9,509,525 B2
(45) Date of Patent: Nov. 29, 2016

(54) INTELLIGENT ILLUMINATION DEVICE

(75) Inventor: David J. Knapp, Austin, TX (US)

(73) Assignee: Ketra, Inc., Austin, TX (US)

(*) Notice: Subject to any disclaimer, the term of this patent is extended or adjusted under 35 U.S.C. 154(b) by 961 days.

(21) Appl. No.: 12/803,805

(22) Filed: Jul. 7, 2010

(65) Prior Publication Data

US 2010/0327764 A1    Dec. 30, 2010

Related U.S. Application Data

(63) Continuation-in-part of application No. 12/360,467, filed on Jan. 27, 2009, now Pat. No. 8,179,787, and a continuation-in-part of application No. 12/584,143, filed on Sep. 1, 2009, now Pat. No. 8,886,047.

(Continued)

(51) Int. Cl.
| | |
|---|---|
| H05B 37/02 | (2006.01) |
| H04L 12/43 | (2006.01) |
| H04L 12/437 | (2006.01) |
| H04L 12/40 | (2006.01) |

(52) U.S. Cl.
CPC ............. *H04L 12/43* (2013.01); *H04L 12/437* (2013.01); *H04L 2012/40273* (2013.01)

(58) Field of Classification Search
CPC ................ H04L 12/43; H04L 12/437; H04L 2012/40273
USPC .......................................... 315/149–250, 307
See application file for complete search history.

(56) References Cited

U.S. PATENT DOCUMENTS

| | | | |
|---|---|---|---|
| 4,029,976 A | 6/1977 | Fish et al. | |
| 4,206,444 A * | 6/1980 | Ferlan ................. | H04M 11/007 340/12.32 |
| 4,402,090 A | 8/1983 | Gfeller et al. | |
| 4,713,841 A | 12/1987 | Porter et al. | |

(Continued)

FOREIGN PATENT DOCUMENTS

| | | |
|---|---|---|
| CN | 1291282 | 4/2001 |
| CN | 1396616 | 2/2003 |

(Continued)

OTHER PUBLICATIONS

Office Action mailed Jun. 10, 2013 for U.S. Appl. No. 12/924,628.

(Continued)

*Primary Examiner* — Tuyet Vo
*Assistant Examiner* — Amy Yang
(74) *Attorney, Agent, or Firm* — Kevin L. Daffer; Matheson Keys Daffer & Kordzik PLLC

(57) ABSTRACT

Intelligent illumination device are disclosed that use components in an LED light to perform one or more of a wide variety of desirable lighting functions for very low cost. The LEDs that produce light can be periodically turned off momentarily, for example, for a duration that the human eye cannot perceive, in order for the light to receive commands optically. The optically transmitted commands can be sent to the light, for example, using a remove control device. The illumination device can use the LEDs that are currently off to receive the data and then configure the light accordingly, or to measure light. Such light can be ambient light for a photosensor function, or light from other LEDs in the illumination device to adjust the color mix.

54 Claims, 4 Drawing Sheets

Related U.S. Application Data

(60) Provisional application No. 61/224,904, filed on Jul. 12, 2009, provisional application No. 61/273,518, filed on Aug. 5, 2009, provisional application No. 61/273,536, filed on Aug. 5, 2009, provisional application No. 61/277,871, filed on Sep. 30, 2009, provisional application No. 61/281,046, filed on Nov. 12, 2009, provisional application No. 61/336,242, filed on Jan. 19, 2010, provisional application No. 61/339,273, filed on Mar. 2, 2010, provisional application No. 61/094,595, filed on Sep. 5, 2008.

(56) References Cited

U.S. PATENT DOCUMENTS

| | | | | |
|---|---|---|---|---|
| 4,745,402 | A | 5/1988 | Auerbach | |
| 4,809,359 | A | 2/1989 | Dockery | |
| 5,018,057 | A * | 5/1991 | Biggs et al. | 362/295 |
| 5,103,466 | A | 4/1992 | Bazes | |
| 5,181,015 | A | 1/1993 | Marshall et al. | |
| 5,193,201 | A | 3/1993 | Tymes | |
| 5,218,356 | A | 6/1993 | Knapp | |
| 5,299,046 | A | 3/1994 | Spaeth et al. | 359/154 |
| 5,317,441 | A | 5/1994 | Sidman | |
| 5,541,759 | A | 7/1996 | Neff et al. | |
| 5,619,262 | A | 4/1997 | Uno | |
| 5,657,145 | A | 8/1997 | Smith | |
| 5,797,085 | A | 8/1998 | Beuk et al. | |
| 5,905,445 | A | 5/1999 | Gurney et al. | |
| 6,016,038 | A | 1/2000 | Mueller et al. | 315/291 |
| 6,067,595 | A | 5/2000 | Lindenstruth | |
| 6,069,929 | A * | 5/2000 | Yabe et al. | 375/368 |
| 6,084,231 | A | 7/2000 | Popat | |
| 6,094,014 | A | 7/2000 | Bucks et al. | |
| 6,094,340 | A | 7/2000 | Min | |
| 6,108,114 | A | 8/2000 | Gilliland et al. | |
| 6,127,783 | A | 10/2000 | Pashley et al. | |
| 6,147,458 | A | 11/2000 | Bucks et al. | |
| 6,150,774 | A | 11/2000 | Mueller et al. | 315/291 |
| 6,234,645 | B1 | 5/2001 | Börner et al. | 362/231 |
| 6,234,648 | B1 | 5/2001 | Börner et al. | 362/235 |
| 6,250,774 | B1 | 6/2001 | Begemann et al. | 362/231 |
| 6,333,605 | B1 | 12/2001 | Grouev et al. | |
| 6,344,641 | B1 | 2/2002 | Blalock et al. | |
| 6,356,774 | B1 | 3/2002 | Bernstein et al. | |
| 6,359,712 | B1 | 3/2002 | Kamitani | |
| 6,384,545 | B1 | 5/2002 | Lau | 315/292 |
| 6,396,815 | B1 | 5/2002 | Greaves et al. | |
| 6,414,661 | B1 | 7/2002 | Shen et al. | |
| 6,441,558 | B1 | 8/2002 | Muthu et al. | |
| 6,448,550 | B1 | 9/2002 | Nishimura | |
| 6,495,964 | B1 | 12/2002 | Muthu et al. | |
| 6,498,440 | B2 | 12/2002 | Stam et al. | 315/291 |
| 6,513,949 | B1 | 2/2003 | Marshall et al. | 362/231 |
| 6,577,512 | B2 | 6/2003 | Tripathi et al. | |
| 6,617,795 | B2 | 9/2003 | Bruning | 315/151 |
| 6,636,003 | B2 | 10/2003 | Rahm et al. | 315/179 |
| 6,639,574 | B2 | 10/2003 | Scheibe | |
| 6,664,744 | B2 | 12/2003 | Dietz | 315/291 |
| 6,692,136 | B2 | 2/2004 | Marshall et al. | 362/231 |
| 6,741,351 | B2 | 5/2004 | Marshall et al. | |
| 6,753,661 | B2 | 6/2004 | Muthu et al. | |
| 6,788,011 | B2 | 9/2004 | Mueller et al. | 315/294 |
| 6,806,659 | B1 | 10/2004 | Mueller et al. | 315/295 |
| 6,831,569 | B2 | 12/2004 | Wang et al. | 340/825.52 |
| 6,831,626 | B2 | 12/2004 | Nakamura et al. | |
| 6,853,150 | B2 | 2/2005 | Clauberg et al. | 315/185 |
| 6,879,263 | B2 | 4/2005 | Pederson et al. | 340/815.45 |
| 6,965,205 | B2 | 11/2005 | Piepgras et al. | |
| 6,969,954 | B2 | 11/2005 | Lys | 315/155 |
| 6,975,079 | B2 | 12/2005 | Lys et al. | 315/292 |
| 7,006,768 | B1 | 2/2006 | Franklin | |
| 7,014,336 | B1 | 3/2006 | Ducharme et al. | 362/231 |
| 7,038,399 | B2 | 5/2006 | Lys et al. | 315/291 |
| 7,046,160 | B2 | 5/2006 | Pederson et al. | 340/815.45 |
| 7,072,587 | B2 * | 7/2006 | Dietz et al. | 398/138 |
| 7,088,031 | B2 * | 8/2006 | Brantner et al. | 310/319 |
| 7,119,500 | B2 | 10/2006 | Young | |
| 7,135,824 | B2 | 11/2006 | Lys et al. | 315/292 |
| 7,161,311 | B2 | 1/2007 | Mueller et al. | 315/294 |
| 7,166,966 | B2 | 1/2007 | Naugler, Jr. et al. | |
| 7,194,209 | B1 | 3/2007 | Robbins et al. | |
| 7,233,115 | B2 | 6/2007 | Lys | 315/291 |
| 7,233,831 | B2 | 6/2007 | Blackwell | 700/17 |
| 7,252,408 | B2 | 8/2007 | Mazzochette et al. | 362/294 |
| 7,255,458 | B2 | 8/2007 | Ashdown | 362/246 |
| 7,256,554 | B2 | 8/2007 | Lys | 315/291 |
| 7,262,559 | B2 | 8/2007 | Tripathi et al. | |
| 7,294,816 | B2 | 11/2007 | Ng et al. | |
| 7,315,139 | B1 | 1/2008 | Selvan et al. | |
| 7,319,298 | B2 | 1/2008 | Jungwirth et al. | |
| 7,329,998 | B2 | 2/2008 | Jungwirth | |
| 7,330,002 | B2 | 2/2008 | Joung | |
| 7,330,662 | B2 | 2/2008 | Zimmerman | |
| 7,352,972 | B2 | 4/2008 | Franklin | |
| 7,358,706 | B2 | 4/2008 | Lys | 323/222 |
| 7,359,640 | B2 | 4/2008 | Onde et al. | |
| 7,362,320 | B2 | 4/2008 | Payne et al. | |
| 7,372,859 | B2 | 5/2008 | Hall et al. | 370/400 |
| 7,400,310 | B2 | 7/2008 | LeMay | |
| 7,445,340 | B2 | 11/2008 | Conner et al. | |
| 7,511,695 | B2 | 3/2009 | Furukawa et al. | |
| 7,525,611 | B2 | 4/2009 | Zagar et al. | |
| 7,554,514 | B2 | 6/2009 | Nozawa | |
| 7,573,210 | B2 | 8/2009 | Ashdown et al. | |
| 7,583,901 | B2 | 9/2009 | Nakagawa et al. | |
| 7,606,451 | B2 | 10/2009 | Morita | 385/24 |
| 7,607,798 | B2 * | 10/2009 | Panotopoulos | 362/233 |
| 7,619,193 | B2 | 11/2009 | Deurenberg | |
| 7,649,527 | B2 | 1/2010 | Cho et al. | |
| 7,659,672 | B2 | 2/2010 | Yang | |
| 7,683,864 | B2 | 3/2010 | Lee et al. | |
| 7,701,151 | B2 | 4/2010 | Petrucci et al. | |
| 7,737,936 | B2 | 6/2010 | Daly | |
| 7,828,479 | B1 | 11/2010 | Aslan et al. | |
| 8,013,538 | B2 * | 9/2011 | Zampini et al. | 315/291 |
| 8,018,135 | B2 | 9/2011 | Van De Ven et al. | |
| 8,040,299 | B2 | 10/2011 | Kretz et al. | |
| 8,044,899 | B2 | 10/2011 | Ng et al. | |
| 8,044,918 | B2 | 10/2011 | Choi | |
| 8,057,072 | B2 | 11/2011 | Takenaka et al. | |
| 8,075,182 | B2 | 12/2011 | Dai et al. | |
| 8,076,869 | B2 | 12/2011 | Shatford et al. | |
| 8,159,150 | B2 | 4/2012 | Ashdown et al. | |
| 8,174,197 | B2 | 5/2012 | Ghanem et al. | |
| 8,174,205 | B2 | 5/2012 | Myers et al. | |
| 8,283,876 | B2 | 10/2012 | Ji | |
| 8,299,722 | B2 | 10/2012 | Melanson | |
| 8,362,707 | B2 | 1/2013 | Draper et al. | |
| 8,471,496 | B2 | 6/2013 | Knapp | |
| 8,521,035 | B2 | 8/2013 | Knapp et al. | |
| 8,556,438 | B2 | 10/2013 | McKenzie et al. | |
| 8,569,974 | B2 | 10/2013 | Chobot | |
| 8,595,748 | B1 | 11/2013 | Haggerty et al. | |
| 8,633,655 | B2 | 1/2014 | Kao et al. | |
| 8,653,758 | B2 | 2/2014 | Radermacher et al. | |
| 8,680,787 | B2 | 3/2014 | Veskovic | |
| 8,704,666 | B2 | 4/2014 | Baker, Jr. | |
| 8,721,115 | B2 | 5/2014 | Ing et al. | |
| 8,749,172 | B2 | 6/2014 | Knapp | |
| 8,773,032 | B2 | 7/2014 | May et al. | |
| 8,791,647 | B2 | 7/2014 | Kesterson et al. | |
| 8,816,600 | B2 | 8/2014 | Elder | |
| 8,911,160 | B2 | 12/2014 | Seo et al. | |
| 2001/0020123 | A1 | 9/2001 | Diab et al. | |
| 2001/0030668 | A1 | 10/2001 | Erten et al. | |
| 2002/0014643 | A1 | 2/2002 | Kubo et al. | |
| 2002/0033981 | A1 | 3/2002 | Keller et al. | |
| 2002/0047624 | A1 | 4/2002 | Stam et al. | |
| 2002/0049933 | A1 | 4/2002 | Nyu | |
| 2002/0134908 | A1 | 9/2002 | Johnson | |
| 2002/0138850 | A1 | 9/2002 | Basil et al. | |
| 2002/0171608 | A1 | 11/2002 | Kanai et al. | |
| 2003/0103413 | A1 | 6/2003 | Jacobi, Jr. et al. | |

(56) References Cited

U.S. PATENT DOCUMENTS

| | | | |
|---|---|---|---|
| 2003/0122749 A1 | 7/2003 | Booth, Jr. et al. | 345/82 |
| 2003/0133491 A1 | 7/2003 | Shih | |
| 2003/0179721 A1 | 9/2003 | Shurmantine et al. | |
| 2004/0044709 A1 | 3/2004 | Cabrera et al. | |
| 2004/0052076 A1 | 3/2004 | Mueller et al. | 362/293 |
| 2004/0052299 A1 | 3/2004 | Jay et al. | |
| 2004/0101312 A1 | 5/2004 | Cabrera | |
| 2004/0136682 A1 | 7/2004 | Watanabe | |
| 2004/0201793 A1 | 10/2004 | Anandan et al. | |
| 2004/0220922 A1 | 11/2004 | Lovison et al. | |
| 2004/0257311 A1 | 12/2004 | Kanai et al. | |
| 2005/0004727 A1 | 1/2005 | Remboski et al. | 701/36 |
| 2005/0030203 A1* | 2/2005 | Sharp et al. | 340/907 |
| 2005/0030267 A1 | 2/2005 | Tanghe et al. | |
| 2005/0053378 A1 | 3/2005 | Stanchfield et al. | |
| 2005/0077838 A1 | 4/2005 | Blumel | |
| 2005/0110777 A1 | 5/2005 | Geaghan et al. | 345/179 |
| 2005/0169643 A1 | 8/2005 | Franklin | |
| 2005/0200292 A1 | 9/2005 | Naugler, Jr. et al. | 315/149 |
| 2005/0207157 A1 | 9/2005 | Tani | |
| 2005/0242742 A1 | 11/2005 | Cheang et al. | |
| 2005/0265731 A1 | 12/2005 | Keum et al. | |
| 2006/0145887 A1* | 7/2006 | McMahon | 340/815.45 |
| 2006/0164291 A1 | 7/2006 | Gunnarsson | 342/51 |
| 2006/0198463 A1 | 9/2006 | Godin | |
| 2006/0220990 A1 | 10/2006 | Coushaine et al. | |
| 2006/0227085 A1 | 10/2006 | Boldt, Jr. et al. | 345/83 |
| 2007/0040512 A1 | 2/2007 | Jungwirth et al. | |
| 2007/0109239 A1 | 5/2007 | den Boer et al. | |
| 2007/0132592 A1 | 6/2007 | Stewart et al. | 340/572.8 |
| 2007/0139957 A1 | 6/2007 | Haim et al. | 362/600 |
| 2007/0248180 A1 | 10/2007 | Bowman et al. | |
| 2007/0254694 A1 | 11/2007 | Nakagwa et al. | |
| 2007/0279346 A1 | 12/2007 | den Boer et al. | |
| 2008/0061717 A1 | 3/2008 | Bogner et al. | |
| 2008/0107029 A1 | 5/2008 | Hall et al. | |
| 2008/0120559 A1 | 5/2008 | Yee | |
| 2008/0136334 A1 | 6/2008 | Robinson et al. | |
| 2008/0136770 A1 | 6/2008 | Peker et al. | |
| 2008/0136771 A1 | 6/2008 | Chen et al. | |
| 2008/0150864 A1 | 6/2008 | Bergquist | |
| 2008/0186898 A1 | 8/2008 | Petite | |
| 2008/0222367 A1 | 9/2008 | Co | |
| 2008/0235418 A1 | 9/2008 | Werthen et al. | |
| 2008/0253766 A1* | 10/2008 | Yu et al. | 398/41 |
| 2008/0265799 A1* | 10/2008 | Sibert | 315/292 |
| 2008/0297070 A1 | 12/2008 | Kuenzler et al. | 315/308 |
| 2008/0304833 A1 | 12/2008 | Zheng | |
| 2008/0309255 A1 | 12/2008 | Myers et al. | 315/297 |
| 2008/0317475 A1 | 12/2008 | Pederson et al. | |
| 2009/0026978 A1 | 1/2009 | Robinson | |
| 2009/0040154 A1 | 2/2009 | Scheibe | |
| 2009/0049295 A1 | 2/2009 | Erickson et al. | |
| 2009/0051496 A1 | 2/2009 | Pahlavan et al. | |
| 2009/0121238 A1 | 5/2009 | Peck | |
| 2009/0171571 A1 | 7/2009 | Son et al. | |
| 2009/0196282 A1 | 8/2009 | Fellman et al. | |
| 2009/0245101 A1 | 10/2009 | Kwon et al. | |
| 2009/0278789 A1 | 11/2009 | Declercq et al. | |
| 2009/0284511 A1 | 11/2009 | Takasugi et al. | |
| 2009/0303972 A1 | 12/2009 | Flammer, III et al. | |
| 2010/0005533 A1 | 1/2010 | Shamir | |
| 2010/0054748 A1 | 3/2010 | Sato | |
| 2010/0061734 A1* | 3/2010 | Knapp | 398/128 |
| 2010/0096447 A1 | 4/2010 | Kwon et al. | |
| 2010/0134021 A1 | 6/2010 | Ayres | |
| 2010/0134024 A1 | 6/2010 | Brandes | |
| 2010/0141159 A1 | 6/2010 | Shiu et al. | |
| 2010/0182294 A1 | 7/2010 | Roshan et al. | |
| 2010/0188443 A1 | 7/2010 | Lewis et al. | |
| 2010/0188972 A1 | 7/2010 | Knapp | 370/226 |
| 2010/0194299 A1 | 8/2010 | Ye et al. | |
| 2010/0213856 A1 | 8/2010 | Mizusako | |
| 2010/0272437 A1 | 10/2010 | Yoon et al. | |
| 2010/0301777 A1 | 12/2010 | Kraemer | |
| 2010/0327764 A1 | 12/2010 | Knapp | 315/250 |
| 2011/0031894 A1 | 2/2011 | Van De Ven | |
| 2011/0044343 A1 | 2/2011 | Sethuram et al. | |
| 2011/0052214 A1 | 3/2011 | Shimada et al. | |
| 2011/0062874 A1 | 3/2011 | Knapp | 315/158 |
| 2011/0063214 A1 | 3/2011 | Knapp | 345/158 |
| 2011/0063268 A1 | 3/2011 | Knapp | 345/207 |
| 2011/0068699 A1 | 3/2011 | Knapp | 315/158 |
| 2011/0069094 A1 | 3/2011 | Knapp | 345/690 |
| 2011/0069960 A1 | 3/2011 | Knapp et al. | 389/103 |
| 2011/0133654 A1 | 6/2011 | McKenzie et al. | |
| 2011/0148315 A1 | 6/2011 | Van Der Veen et al. | |
| 2011/0150028 A1 | 6/2011 | Nguyen et al. | |
| 2011/0248640 A1* | 10/2011 | Welten | H05B 33/083 315/210 |
| 2011/0253915 A1 | 10/2011 | Knapp | |
| 2011/0299854 A1 | 12/2011 | Jonsson et al. | |
| 2011/0309754 A1 | 12/2011 | Ashdown et al. | |
| 2012/0056545 A1 | 3/2012 | Radermacher et al. | |
| 2012/0153839 A1 | 6/2012 | Farley et al. | |
| 2012/0229032 A1 | 9/2012 | Van De Ven et al. | |
| 2012/0299481 A1 | 11/2012 | Stevens | |
| 2012/0306370 A1 | 12/2012 | Van De Ven et al. | |
| 2013/0016978 A1 | 1/2013 | Son et al. | |
| 2013/0088522 A1 | 4/2013 | Gettemy et al. | |
| 2013/0201690 A1 | 8/2013 | Vissenberg et al. | |
| 2013/0257314 A1 | 10/2013 | Alvord et al. | |
| 2013/0293147 A1 | 11/2013 | Rogers et al. | |
| 2014/0028377 A1 | 1/2014 | Rosik et al. | |
| 2015/0022110 A1 | 1/2015 | Sisto | |

FOREIGN PATENT DOCUMENTS

| | | | |
|---|---|---|---|
| CN | 1573881 | 2/2005 | |
| CN | 1650673 | 8/2005 | |
| CN | 1849707 | 10/2006 | |
| CN | 101083866 | 12/2007 | |
| CN | 101150904 | 3/2008 | |
| CN | 101331798 | 12/2008 | |
| CN | 101458067 | 6/2009 | |
| EP | 0196347 | 10/1986 | |
| EP | 0456462 | 11/1991 | |
| EP | 2273851 | 1/2011 | |
| GB | 2307577 | 5/1997 | |
| JP | 06-302384 | 10/1994 | H05B 37/02 |
| JP | 08-201472 | 8/1996 | |
| JP | 11-025822 | 1/1999 | H01H 35/00 |
| JP | 2001-514432 | 9/2001 | H05B 37/02 |
| JP | 2004-325643 | 11/2004 | |
| JP | 2005-539247 | 12/2005 | |
| JP | 2006-260927 | 9/2006 | |
| JP | 2007-266974 | 10/2007 | G06K 17/00 |
| JP | 2007-267037 | 10/2007 | |
| JP | 2008-507150 | 3/2008 | |
| JP | 2008-300152 | 12/2008 | |
| JP | 2009-134877 | 6/2009 | |
| WO | 00/37904 | 6/2000 | |
| WO | 03/075617 | 9/2003 | |
| WO | 2005/024898 | 3/2005 | |
| WO | 2007/069149 | 6/2007 | |
| WO | 2008/065607 | 6/2008 | |
| WO | 2008-129453 | 10/2008 | |
| WO | 2010/124315 | 11/2010 | |
| WO | 2012/005771 | 1/2012 | |
| WO | 2012/042429 | 4/2012 | |
| WO | 2013/142437 | 9/2013 | |

OTHER PUBLICATIONS

Final Office Action mailed Jun. 14, 2013 for U.S. Appl. No. 12/806,117.
Office Action mailed Jun. 27, 2013 for U.S. Appl. No. 13/178,686.
Final Office Action mailed Jul. 9, 2013 for U.S. Appl. No. 12/806,118.
International Search Report & Written Opinion for PCT/US2012/052774 mailed Feb. 4, 2013.

(56) References Cited

OTHER PUBLICATIONS

B. Hall et al., "*Jet Engine Control Using Ethernet with a BRAIN (Postprint)*," Postprint of the 44th AIAA/ASME/SAE/ASEE Joint Propulsion Conference and Exhibition, Jul. 2008, See Section II.G.
A. Kebemou, "*A Partitioning-Centric Approach for the Modeling and the Methodical Design of Automotive Embedded System Architectures,*" Dissertation of Technical University of Berlin, 2008, See Section 2.2.3.
D. O'Brien et al., *Visible Light Communications and Other Developments in Optical Wireless,* Wireless World Research Forum, 2006.
J. Zalewski et al., "*Safety Issues in Avionics and Automotive Databuses,*" IFAC World Congress, Jul. 4, 2005.
Project IEEE P802.15 Working Group for Wireless Personal Area Networks (WPANs), "*Visible Light Communication; Tutorial,*" Mar. 9, 2008.
PCT/US2010/000219, "International Search Report," dated Oct. 12, 2010.
PCT/US2010/002171, "International Search Report," dated Nov. 24, 2010.
PCT/US2010/004953, "International Search Report," dated Mar. 22, 2010.
PCT/US2010/001919, "International Search Report," dated Feb. 24, 2011.
U.S. Appl. No. 12/924,628, "*LED Transceiver Front End Circuitry and Related Methods,*" filed Sep. 30, 2010.
PCT/US2009/004953, "International Preliminary Report on Patentability and Written Opinion," dated Mar. 8, 2011.
PCT/US2010/000219, "Written Opinion of the International Searching Authority," dated Oct. 12, 2010.
PCT/US2010/001919, "Written Opinion of the International Searching Authority," dated Feb. 24, 2011.
PCT/US2010/002171, "Written Opinion of the International Searching Authority," dated Nov. 24, 2010.
Notice of Allowance mailed Feb. 4, 2013 for U.S. Appl. No. 12/809,113.
Notice of Allowance mailed Feb. 25, 2013 for U.S. Appl. No. 12/806,121.
Notice of Allowance mailed May 3, 2013 for U.S. Appl. No. 12/806,126.
Office Action mailed May 12, 2011 for U.S. Appl. No. 12/360,467.
Final Office Action mailed Nov. 28, 2011 for U.S. Appl. No. 12/360,467.
Notice of Allowance mailed Jan. 20, 2012 for U.S. Appl. No. 12/360,467.
Office Action Mailed Feb. 1, 2012 for U.S. Appl. No. 12/584,143.
Final Office Action Mailed Sep. 12, 2012 for U.S. Appl. No. 12/584,143.
Office Action Mailed Aug. 2, 2012 for U.S. Appl. No. 12/806,114.
Office Action Mailed Oct. 2, 2012 for U.S. Appl. No. 12/806,117.
Office Action Mailed Jul. 11, 2012 for U.S. Appl. No. 12/806,121.
Final Office Action Mailed Oct. 11, 2012 for U.S. Appl. No. 12/806,121.
Office Action mailed Dec. 17, 2012 for U.S. Appl. No. 12/806,118.
Office Action mailed Oct. 9, 2012 for U.S. Appl. No. 12/806,126.
Office Action mailed Jul. 10, 2012 for U.S. Appl. No. 12/806,113.
Notice of Allowance mailed Oct. 15, 2012 for U.S. Appl. No. 12/806,113.
International Search Report & Written Opinion mailed Sep. 19, 2012 for PCT/US2012/045392.
Partial International Search Report mailed Nov. 16, 2012 for PCT/US2012/052774.
International Search Report & Written Opinion, PCT/US2013/027157, May 16, 2013.
Office Action mailed Nov. 12, 2013 for U.S. Appl. No. 13/231,077.
Office Action mailed Apr. 22, 2014 for U.S. Appl. No. 12/806,114.
Notice of Allowance mailed Jan. 28, 2014 for U.S. Appl. No. 13/178,686.
Notice of Allowance mailed Feb. 21, 2014 for U.S. Appl. No. 12/806,118.
Office Action mailed Jun. 23, 2014 for U.S. Appl. No. 12/806,117.
Final Office Action mailed Jun. 18, 2014 for U.S. Appl. No. 13/231,077.
Office Action mailed Nov. 4, 2013 for CN Application No. 201080032373.7.
Johnson, "Visibile Light Communications," CTC Tech Brief, Nov. 2009, 2 pages.
Chonko, "Use Forward Voltage Drop to Measure Junction Temperature," © 2013 Penton Media, Inc., 5 pages.
Office Action mailed Oct. 24, 2013 for U.S. Appl. No. 12/806,117.
Notice of Allowance mailed Oct. 31, 2013 for U.S. Appl. No. 12/924,628.
Notice of Allowance mailed Aug. 21, 2014 for U.S. Appl. No. 12/584,143.
"Color Management of a Red, Green, and Blue LED Combinational Light Source," Avago Technologies, Mar. 2010, pp. 1-8.
Final Office Action mailed Jan. 28, 2015 for U.S. Appl. No. 12/806,117.
Office Action mailed Mar. 6, 2015 for U.S. Appl. No. 13/773,322.
Office Action mailed Feb. 2, 2015 for CN Application 201080035731.X.
Office Action mailed Jul. 1, 2014 for JP Application 2012-520587.
Office Action mailed Feb. 17, 2015 for JP Application 2012-520587.
Office Action mailed Mar. 11, 2014 for JP 2012-523605.
Office Action mailed Sep. 24, 2014 for JP 2012-523605.
Office Action mailed Mar. 25, 2015 for U.S. Appl. No. 14/305,472.
Notice of Allowance mailed Mar. 30, 2015 for U.S. Appl. No. 14/097,355.
Office Action mailed Apr. 8, 2015 for U.S. Appl. No. 14/305,456.
Notice of Allowance mailed Sep. 11, 2015 for U.S. Appl. No. 13/970,944.
Notice of Allowance mailed Sep. 25, 2015 for U.S. Appl. No. 14/604,886.
Notice of Allowance mailed Oct. 9, 2015 for U.S. Appl. No. 14/604,881.
International Search Report & Written Opinion mailed Oct. 28, 2015 for PCT/US2015/037660.
Partial International Search Report mailed Mar. 27, 2015 for PCT/US2014/068556.
Bouchet et al., "Visible-light communication system enabling 73 Mb/s data streaming," IEEE Globecom Workshop on Optical Wireless Communications, 2010, pp. 1042-1046.
Office Action for U.S. Appl. No. 14/573,207 mailed Nov. 4, 2015.
Notice of Allowance for U.S. Appl. No. 14/510,243 mailed Nov. 6, 2015.
Notice of Allowance for U.S. Appl. No. 12/806,117 mailed Nov. 18, 2015.
Partial International Search Report for PCT/US2015/045252 mailed Nov. 18, 2015.
Office Action for U.S. Appl. No. 13/970,990 mailed Aug. 20, 2015.
Partial International Search Report for PCT/US2015/037660 mailed Aug. 21, 2015.
Final Office Action for U.S. Appl. No. 13/773,322 mailed Sep. 2, 2015.
"LED Fundamentals, How to Read a Datasheet (Part 2 of 2) Characteristic Curves, Dimensions and Packaging," Aug. 19, 2011, OSRAM Opto Semiconductors, 17 pages.
International Search Report & Written Opinion for PCT/US2014/068556 mailed Jun. 22, 2015.
Office Action for U.S. Appl. No. 13/970,964 mailed Jun. 29, 2015.
Office Action for U.S. Appl. No. 14/510,243 mailed Jul. 29, 2015.
Office Action for U.S. Appl. No. 14/510,283 mailed Jul. 29, 2015.
Office Action for U.S. Appl. No. 14/510,266 mailed Jul. 31, 2015.
Notice of Allowance mailed May 22, 2015 for U.S. Appl. No. 14/510,212.
Office Action mailed May 27, 2015 for U.S. Appl. No. 12/806,117.

* cited by examiner

| Hex Code 13 | Commands 14 |
|---|---|
| 0 | On |
| 1 | Off |
| 2 | Dimmer up |
| 3 | Dimmer down |
| 4 | On event - Timer |
| 5 | On event - Photosensor |
| 6 | Set On time |
| 7 | Clear On event |
| 8 | Off event - Timer |
| 9 | Off event -Photosensor |
| A | Set Off time |
| B | Clear Off event |
| C | Set Time of Day |
| D | Set Color 1 |
| E | Set Color 2 |
| F | Set Color 3 |

Table 2: List of Functions

INTELLIGENT ILLUMINATION DEVICE

RELATED APPLICATIONS

This application claims priority to the following provisional application: Provisional Application Ser. Number 61/224,904 entitled "INTELLIGENT ILLUMINATION DEVICE," which was filed on Jul. 12, 2009, and is hereby incorporated by reference in its entirety. This application also claims priority to the following provisional applications: U.S. Provisional Patent Application Ser. No. 61/273,518 filed Aug. 5, 2009 by David J. Knapp and entitled "Display and Optical Pointer Systems and Related Methods;" U.S. Provisional Patent Application Ser. No. 61/273,536 filed Aug. 5, 2009 by David J. Knapp and entitled "Display Calibration Systems and Related Methods;" U.S. Provisional Patent Application Ser. No. 61/277,871 filed Sep. 30, 2009 by David J. Knapp and entitled "LED Calibration Systems and Related Methods;" U.S. Provisional Patent Application Ser. No. 61/281,046 filed Nov. 12, 2009 by David J. Knapp and entitled "LED Calibration Systems and Related Methods;" U.S. Provisional Patent Application Ser. No. 61/336,242 filed Jan. 19, 2010 by David J. Knapp and entitled "Illumination Devices and Related Systems and Methods;" and U.S. Provisional Patent Application Ser. No. 61/339,273 filed Mar. 2, 2010 by David J. Knapp, et al., and entitled "Systems and Methods for Visible Light Communication." This application is also a continuation-in-part application of the following patent applications: U.S. patent application Ser. No. 12/360,467 filed Jan. 27, 2009 now U.S. Pat. No. 8,179,787 by David J. Knapp and entitled "Fault Tolerant Network Utilizing Bi-Directional Point-to-Point Communications Links Between Nodes;" and U.S. patent application Ser. No. 12/584,143, filed Sep. 1, 2009 now U.S. Pat. No. 8,886,047 by David J. Knapp and entitled "Optical Communication Device, Method and System;" which in turn claims priority to U.S. Provisional Patent Application Ser. No. 61/094,595 filed on Sep. 5, 2008 by David J. Knapp and entitled "Optical Communication Device, Method and System."

TECHNICAL FIELD OF THE INVENTION

This invention relates to illumination devices and, more particularly, to controlling illumination devices.

BACKGROUND

Conventional lighting historically has used incandescent and fluorescent bulbs, but recently with the invention of the blue LED, has started to use LED lights. The initial cost of the LED light may be high, but over time the power savings can reduce the overall cost of lighting substantially. Part of the high initial cost of a power efficient LED light is due to the special electronics necessary to create a constant current to the LEDs from a power source. With this special electronics, however, implementation of features such as remote control, dimming, photo-sensing, timing, and color adjustment in the light are possible at very little additional cost. Such features for conventional lighting are performed by separate electronic units that turn power to the light on and off, which add cost and complexity.

Most LED lights today consist of multiple LEDs connected together in series and/or parallel, and are driven by a switching power supply. In an AC mains connected light, the power supply converts from the mains voltage, 85-240V, to a current for the LEDs, while the power supply in a battery powered light converts from the battery voltage to a current for the LEDs. Such circuits are offered by companies such as OnSemi and Supertex for mains connected, and Maxim for battery powered.

Less efficient LED lights simply connect the LEDs to the power supply through a series resistor. Although cheaper, the resistor dissipates substantial power, and when connected to an AC supply, the light has a poor power factor. The power factor is poor since the LEDs only conduct during the peaks in the AC waveform.

The LEDs in a light can be any color or any combination of colors, including white. White LEDs are typically made with a blue LED covered in some type of yellow phosphor. Much of the blue light from the LED is absorbed by the phosphor and re-emitted at lower frequencies corresponding to green, yellow, and some red colors. Some advantages of this approach include low cost and more natural continuous spectrum light. Some disadvantages include low efficiency due to losses in the phosphor, a bluish color from the LED, and reduced reliability due to degradation of the phosphor. Companies such as Cree Lighting and Nichia market such high brightness LEDs.

The spectrum of one particular Cree product shows a sharp peak around 450 nm, which is the blue light produced by the LED, and a broad peak around 550 to 600 nm, which is yellow from the phosphor. At 500 nm and 700 nm, the output power is only 20% of the peak power. In contrast, the spectrum of sunlight is virtually flat from just below 500 nm to just over 700 nm.

To overcome the lack of energy at the red end of the spectrum, Cree Lighting produces a two color overhead LED lamp that includes strings of red LEDs together with strings of phosphor coated blue LEDs. When comparing the spectrum produced by an RGB source, the Cree white LED plus red LED solution, and the standard output from an incandescent bulb, the spectrum of neither the RGB nor the white plus red light match either the incandescent or sunlight spectrum very well, although the white plus red light produces a good cost/performance compromise for many applications.

The ideal LED light from a color spectrum perspective would consist of many different colored LEDs operating at different power levels to produce a rough approximation of either incandescent or sun light. The combination of red, yellow, green, and blue is probably a minimum number of colors. Although this approach should have a good spectrum and be more energy efficient and reliable, control of the relative power levels in each color is difficult and expensive in practice today.

There are challenges to building even a three color (RGB) LED light that controls the color over process variations, temperature, aging, etc. Some techniques include feedback to the RGB driver circuits through three optically filtered photodiodes. Each photodiode is tuned to the color of each LED and is connected to a signal detection and signal processing function on an IC. The signal processor then controls the red, green, and blue drive currents accordingly. Such color filter photodiodes are offered by Hamamatsu, which are relatively expensive and consume board space that would otherwise be dedicated to producing light instead of receiving light.

National Semiconductor offers an RGB LED driver for LCD display backlighting. Their LP5520 can calibrate out the initial variation in LED optical output and then adjust over temperature. However, it does not compensate for aging. Since the output power of some LEDs goes up over time and some go down, the only effective means of compensation is through actual optical power measurement of each light component.

Cree's white plus red LED lamp includes two chains of 6 white LEDs, and one parallel/serial combination of 30 red LEDs, for a total of 36 LEDs. It also includes a photodetector and a temperature sensor to maintain color as described in US Published Patent Application No. 2008-0309255. A wavelength selective photo-detector monitors the shorter emission wavelength (green and shorter) and adjusts the brightness of the red LEDs in response. Likewise, temperature is monitored with a temperature sensing element, which is used to adjust the drive current to the red LEDs to compensate for brightness degradation with increasing temperature. Neither the optical power produced by the red LEDs nor the optical power produced by the white LEDs with wavelengths longer than green are measured. Any changes in red LED brightness over lifetime are not compensated. A cost effective solution for driving and controlling different color LEDs with good color discrimination and without the cost and board space for additional photodetectors and temperature sensors would be beneficial.

Conventional light dimming switches use a triac circuit that only allows the mains AC voltage to be applied to an incandescent light during part of the cycle. For instance, when set at half power, the voltage signal that passes through to the light is zero for the first 90 degrees of the sinusoidal voltage, jumps to the peak amplitude and follows the sinusoid down to zero for the second 90 degrees, stays at zero for the next 90 degrees, and finally jumps to the negative peak voltage and follows the sinusoid back to zero. This approach is a cheap and effective way for a consumer to dim a resistive incandescent bulb.

Although the triac dimmer reduces power consumption in the light bulb, it does not reduce the power that the utility company must produce. Power companies produce current that is in phase with the voltage. As the voltage increases, the current increases. If the entire load on a power generation plant consisted of lights dimmed 50% with triacs, the current produced during the first half of the positive and negative cycles would not go to the bulbs, but it would have to go somewhere. The utility must generate the same amount of power whether the lights are full on or dimmed and must deal with potentially dangerous transients on the grid.

The light from an LED can be reduced by either reducing the drive current or reducing the time that the current is applied by using what is called pulse width modulation (PWM). The current is turned on and off at a rate faster than the eye can see, with the duty cycle proportional to the desired light output. Since the wavelength of light produced by an LED changes with drive current, PWM dimming is sometimes preferred. When replacing an incandescent light with an LED light, an existing triac dimmer still adjusts the power supply to the light. To enable PWM dimming, the LED light circuitry must filter the power supply, detect the duty cycle of the supply, and adjust the PWM duty cycle accordingly, which adds cost and complexity.

Photosensors are commonly used to measure ambient light in a room or daylight outside and to adjust the brightness of a lamp in response. An outdoor lamp may be turned on and off at dusk and dawn respectively, or an indoor lamp may be dimmed such that the light from a window plus the light from the lamp remains constant. For existing technology, such photosensors need to be placed away from lamps so that the light from the lamp does not interfere with the photosensor. Typically, the photosensor is a separate electronic device, which needs to be installed. A lamp with a built in photosensor that is not affected by light output from the lamp and that does not require any wiring changes would be beneficial. Further, a lamp that could provide this functionality without a photosensor would be more beneficial.

Timers that turn a light on and off typically plug into a wall socket and connect and disconnect power to an attached light based on time of day. Such devices are typically bulky. An installed light socket cannot be changed to a timer without significant wiring changes. A replacement bulb that has a timer function built in that does not require additional cost or any wiring changes would be beneficial.

Electrical wiring and lighting switches in a new home or business construction consumes a significant portion of the construction cost. Additionally light switches with dimmers are much more expensive than simple toggle switches, so therefore are used much less frequently. Lights that could be remotely controlled by for instance a device like a TV remote could significantly reduce wiring costs and provide additional features, which would be beneficial.

The developing world is leapfrogging developed world technology. For instance, solar powered homes are wide spread throughout the developing world (i.e., Kenya, India, etc.) Lighting traditionally has been provided by firewood and recently by kerosene, which are terribly inefficient. The combination of a solar panel, a car battery, and led lights provides a much better solution. During the day, the solar panel charges the battery and at night the led light consumes power. The effectiveness of the re-charging system determines the usefulness of the system. Any solar power efficiency improvement is significant. LEDs are photosensitive and can produce power when exposed to light. Harnessing this energy would be beneficial.

The invention described herein, in various embodiments, provides solutions to the issues described above.

SUMMARY

In certain exemplary embodiments, an improved illumination device uses the components in an LED lamp to perform some or all of the above functions for very low cost. The LEDs that produce light can be periodically turned off momentarily, for example, for a duration that the human eye cannot perceive, in order for the lamp to receive commands optically. The optically transmitted commands can be sent to the lamp, for example, using a remote control device. The illumination device can use the LEDs that are currently off to receive the data and then configure the light accordingly, or to measure light. Such light can be ambient light for a photosensor function, or light from other LEDs in the illumination device to adjust the color mix.

In certain exemplary embodiments, an illumination device uses LEDs to produce light and to provide bi-directional communication to a controller that implements power saving features not possible with conventional lighting. The illumination device, for example, can be programmed with modulated light from a remote controller to turn on and off, to adjust brightness or color, and to turn on or off in response to changes in ambient light or timer count values. The LEDs that produce the illumination during normal operation are periodically used to receive modulated light from a controller during short intervals undetectable by the human eye. In response to a command from the remote controller, the illumination device can produce light modulated with data. Additionally, when the remote controller is turned off and is exposed to sunlight, the LEDs in the controller can provide a trickle charge current to maintain full battery power.

In certain aspects, the invention provides a system of an intelligent illumination device and, in some cases, a remote controller. The illumination device, which is typically connected to an. AC mains power supply, can receive commands from the remote controller, which is typically battery powered, via light. The remote controller then programs the lamp for timer or photosensitive operation. For instance, at dusk the lamp could turn on and then go off, the light could come on when power is switched on and goes off a fixed time later, the light could come on and go off at fixed times, or the light could come on at dusk and off at dawn. Dimming could also be enabled or disabled, or could be automatically adjusted based ambient light.

When turned on, the illumination device periodically turns off the LEDs to determine if any commands are being sent or to measure ambient light. The remote control synchronizes to these momentary "light off" periods and sends a command if directed by the user. The commands can be on/off, dim, timer, photo cell, color, etc. When the light is turned off by the remote, ac power is still active. The device goes into a low power mode. When the remote turns the light on, the incident light can power the LEDs and enable the light to turn on. The light can also be turned off by removing AC power and turned on by turning AC power on. Cycling power in a certain sequence can reset the light to a default state.

In certain embodiments, the illumination device uses the photosensitive LEDs (i.e., the red LEDs) to detect received data or DC light during the intervals when the light output is momentarily turned off. For multi-colored light, the illumination device can use a chain of the longest wavelength LEDs (i.e., the red LEDs) to detect the output power of the other colors. With two chains of the longest wavelength LEDs, each chain can measure the output power of the other, thereby enabling a feedback loop to control the output power of each color and the blended color mix.

Once the illumination device (i.e., the "lamp") is installed in an existing socket that may or may not be connected to a dimming switch, the illumination device can be dimmed by the remote controller. The remote controller sends commands to increment or decrement the output light level during the short "off" periods. The dimming function can be performed by pulse width modulating the LED drive current at a switching frequency preferably locked to the switching regulator frequency or by simply adjusting the LED drive current.

If photosensing is enabled, during the short light off periods, the longest wavelength LED chain can be used to measure ambient light. To do so, the LEDs may be configured in photovoltaic mode, and produce a voltage proportional to incident light. If the voltage is above a level specified through a command, the lamp can turn off in response. If the voltage drops back below the specified level, the lamp can turn on. Such a mechanism enables the light to turn on at night and off during the day. In combination with a timer, the light can turn on at dusk and off after a specified amount of time.

When the timer is enabled, the lamp can turn on and off at different times of day or turn off after a specified amount of time after being turned on. The lamp can be turned on by remote control, by power being applied through a switch, or by the photosensor function. In a mains connected application, the timer is synchronized to the AC frequency for a precise frequency reference.

When powered by a battery, the photosensitive LED chains can provide trickle current to re-charge the battery. A chain of 30 red LEDs (e.g., in the CREE lamp) can produce nearly 1 mW of power that can keep a re-chargeable battery charged in applications, such as emergency lights, that are not used often. For applications such as solar-powered, off-grid systems that are common in the developing world, the charging capability of the lamp can augment that of the solar panel.

DESCRIPTION OF THE DRAWINGS

The present invention may be better understood, and its numerous objects, features, and advantages made apparent to those skilled in the art by referencing the accompanying drawings.

Figures 1, 2:
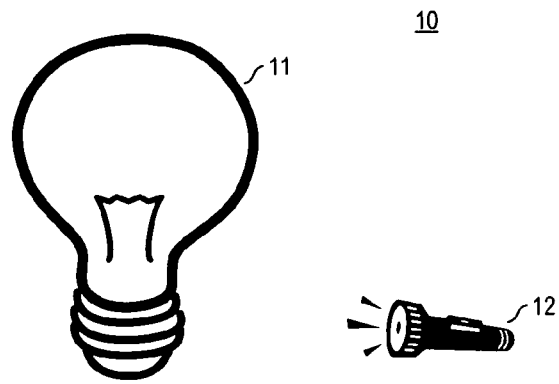
FIG. 1 an exemplary system diagram of an illumination device and a remote controller.
FIG. 2 is an exemplary list of functions performable by an exemplary illumination device.

The use of the same reference symbols in different drawings indicates similar or identical items. While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

Turning now to the drawings, FIG. 1 is one example of an intelligent illumination device system 10 that comprises the illumination device 11 and the remote controller 12. The remote controller 12 is preferably battery powered like a flashlight or TV remote control and is used to program the illumination device 11 with modulated light. When the illumination device 11 is powered preferably by the AC mains of an electrical socket (e.g., an Edison base socket), the illumination device 11 can be controlled by the remote controller 12. When the illumination device 11 is enabled to produce light (i.e., "turned on" or "producing light"), the illumination device 11 briefly and periodically stops emitting light to detect commands from the remote controller 12 or ambient light from the environment, or to calibrate colors in a multi-colored illumination device 11. When the illumination device 11 is powered by the AC mains, but is not enabled to produce light (i.e., "turned off"), the illumination device enters a low power state. Commands from the remote controller 12 can still be detected by the illumination device 11 in this state. The illumination device 11 responds to the remote controller 12 by momentarily producing light modulated with data. To reset the illumination device 11 to a default state, power to the illumination device 11 is cycled in a specific sequence.

FIG. 1 is just one example of many possible intelligent illumination device systems. For example, the illumination device 11 could be powered with a battery or the remote controller 12 could be powered by the AC mains. In another example, if the illumination device is programmed when it is designed or produced, no remote controller 12 is needed. Examples of pre-programmed devices include pre-configured night lights, and lights that automatically turn of perhaps 1 hour (or other delay) after being turned on. In such case, the functionality of the illumination device may be reduced.

In another example, light from the remote controller 12 could power an un-powered illumination device 11 with light while programming. For instance, a consumer could buy a light bulb replacement including this remote controller. The consumer could then hold the bulb to the remote and configure it to turn off 35 minutes after being turned on, then take the programmed bulb and screw in a socket somewhere. Without this self-powered variant, the bulb would need to be screwed into an energized socket in order to program it, which may be possible, but still perhaps less convenient.

In a further example, the remote controller battery could be charged by sunlight or ambient light when not in use. Additionally, multiple illumination devices 11 could communicate with each other. For example, various governments have recently introduced mandates that certain buildings must have intelligent lights that automatically turn on and off based on whether or not people are present. Some large lighting companies provide systems consisting of lamps with motion detectors and 900 MHz RF transceivers. When one lamp in a room detects motion, it tells the rest of the lights to turn on. The two main issues with this approach are: (1) the lights are expensive, and (2) the RF signal passes through walls to other rooms with no people. The devices described herein could communicate with each other via light which: (1) does not require the expense of the RF circuitry, and (2) does not go through walls. Additionally, functions like dimming or color control could benefit from lamps communicating with each other. For example, a user could program one lamp, and that lamp then reconfigures the other lamps. Additional applications could be security where two lamps constantly communicate with each other. If an intruder passes between them and momentarily blocks the light, the lamps detect this and broadcast info to other lamps in the building in sort of a daisy chain way to a central security system.

Table 2 is an example list of commands 14 for the illumination device 11 that enable the remote controller 12 to turn the illumination device 11 on and off, adjust the output power, and change the color to one of three different settings. Additionally, the illumination device 11 can be configured to automatically turn on in response to a time of day counter reaching a particular count or ambient light dropping below a certain level, and to automatically turn off after a timer reaching a particular count from when the illumination device 11 is turned on or ambient light rising above certain level. In this example, the color mix is always automatically measured and adjusted to a specific setting. The example set of commands 14 can use 4 bits to produce hex codes 13.

Preferably, the hex codes 13 are preceded by a synchronization pattern and followed by parity to produce an 8 bit transfer sequence. Additionally, the commands that set a time must be followed with the actual time. Since there are 1440 minutes in a day, a time with one minute resolution requires 11 bits, which could be sent in two successive transfers after the command.

Table 2 is just one example of many possible sets of commands 14 and hex codes 13. For instance, in a multi-color light each individual component could be dimmed or color calibration could be enabled and disabled. As another example the time of day counter could count days of the week as well. The illumination device 11 could have a subset of these functions or could have a variety of other functions such as strobing or continuous color variation. Additionally, illumination device 11 status and register contents could be read. Further, the assignment of hex codes 13 to commands 14 could be completely different and could contain more or less bits depending on the number of commands 14.

Figure 3:
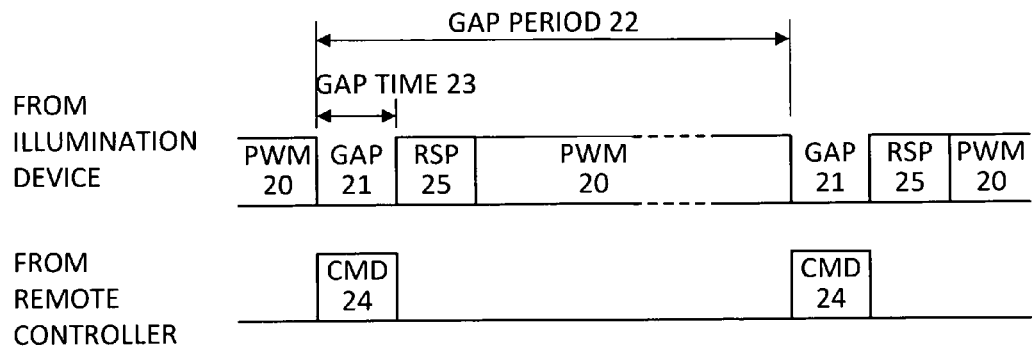
FIG. 3 is an exemplary timing diagram of data communication between the illumination device and the remote controller.

FIG. 3 is an example timing diagram for communicating commands 14 between the illumination device 11 and the remote controller 12 when the illumination device 11 is producing light. Pulse width modulated light PWM 20 from the illumination device 11 is periodically interrupted by gaps 21 when no light is produced. The gap period 22 in this example is one second. The gap time 23 is equal to one half the mains period or 8.33 mSec at 60 Hz. The remote controller 12 synchronizes to gaps 21 in the PWM 20 light from the illumination device 11 and can send commands CMD 24 during gaps 21. When a CMD 24 is sent from the remote controller 12 and is properly received by the illumination device 11, the illumination device 11 provides a response RSP 25 immediately after CMD 24. The remote controller 12 may preferably be narrowly focused (much like a flashlight) to assist a user in directing the remote commands to a particular illumination device in a room with multiple such illumination devices. The user could see the light beam and shine it directly on one light. This would focus light from the remote on the illumination device and light from the illumination device on the detector in the remote.

In this example, the light from the illumination device 11 is pulse width modulated at 16 times the mains frequency or 960 Hz for 60 Hz AC, to enable dimming without changing LED wavelengths. At full brightness, the off time is very short or non-existent and at low light levels, the on time is short. The frequency of the pulses stays fixed. To prevent the remote controller 12 from losing synchronization with the illumination device 11, the last pulse from the illumination device 11 before a gap 21 is preferably not reduced below a minimum width that the remote controller 12 can detect.

In another example, the one second gap time 22 can be shortened to 200 msec for instance, after the illumination device 11 and remote controller 12 communicate a first CMD 24 so that successive commands can be communicated faster. This may be important for dimming since there may be many power level steps between low and high power. Once the remote controller 12 stops sending commands, the gap period 22 widens back to one second intervals.

When the illumination device 11 is not producing light, the remote controller 12 does not detect gaps 21 and can send commands CMD 24 at any. time. The protocol shown in FIG. 3 remains the same except that the illumination device 11 is not outputting PWM 20 light before and after the transaction.

During gaps 21 when commands CMD 24 are not sent or when the illumination device 11 is not producing light, the illumination device 11 can measure ambient light. The ambient light level is subtracted from the received light when commands CMD 24 are sent and is used to determine when to turn the illumination device 11 on or off when photo-sensor functionality is enabled. More specifically, when the illumination device is receiving commands, the background or ambient light produces a DC offset in the optically induced voltage across the LEDs (or photodiode).

This DC offset can be eliminated by measuring the optically induced voltage during gaps 21 when no commands are sent, and subtracting it from the induced voltage when receiving commands. Alternatively, the receiver in the illumination device can high pass filter the induced voltage to remove the DC offset. Since the data rate is low, the receiver may use a digital filter for DC blocking (and equalization). If the DC offset is known prior to receiving a command, the initial state of the digital filter can be set accordingly, and reduce the settling time. When photosensor functionality is enabled, ambient light is measured during gaps 21 when the illumination device is producing light, and measured all the time when not producing light.

Additionally, in a multi-color illumination device 11, the intensity of each individual color can be measured during gaps 21 or when the illumination device 11 is not producing light. For instance, when the illumination device 11 is turned on, the illumination device 11 can briefly measure the intensity of each color before producing the desired light. Then periodically as the illumination device warms up for instance, the color components can be measured during gaps 21.

FIG. 3 is just one example of many possible timing diagrams. The gap period 22 and gap time 23 could be substantially different depending on the applications. The response RSP 25 can be sent at different times or not at all. The commands CMD 24 could even be sent during the off times of the PWM cycle and responses RSP 25 could be variations in PWM duty cycle. To provide additional error protection, commands CMD 24 could be repeated one or more times before taking affect. Many different timing diagrams and communication protocols could be implemented. For an illumination device 11 that is powered by the light from the remote controller 12 instead of a battery or AC mains, the protocol can include significant illumination durations in order to store sufficient charge on a capacitor for instance to power the illumination device 11 and to communicate data.

Figure 4:
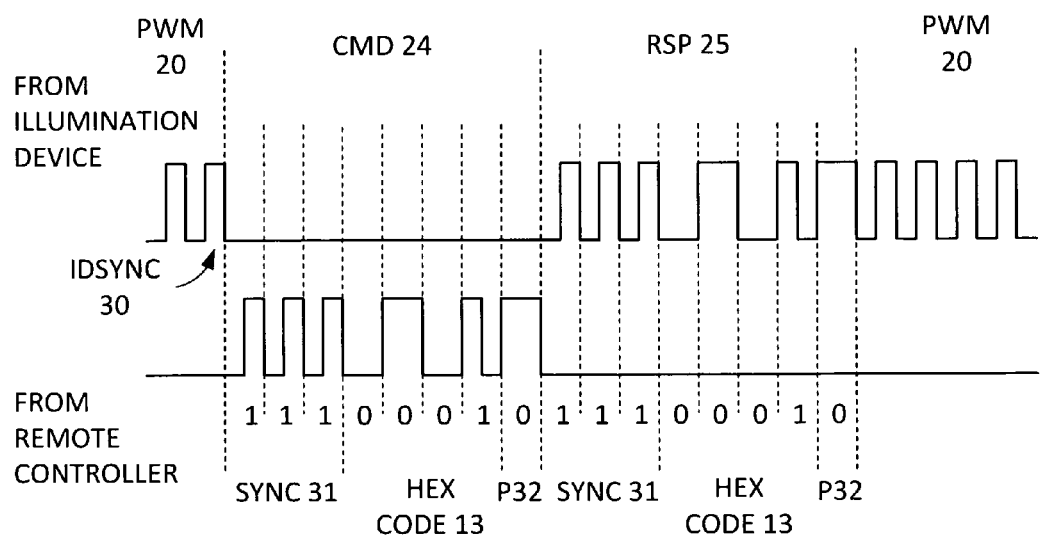
FIG. 4 is an exemplary timing diagram of the bit timing and coding scheme for transferring data between the illumination device and the remote controller.

FIG. 4 is an example timing diagram illustrating the bit level communication between the illumination device 11 and the remote controller 12 when the illumination device 11 is producing light. Communication begins with the illumination device 11 stopping the PWM 20 output. The illumination device synchronization IDSYNC 30 pulse is the last PWM pulse produced by the illumination device 11 prior to a gap 21. The width of IDSYNC 30 is greater than the minimum pulse width detectable by the remote controller 12. Other synchronization sequences, such as short series of pulses, may also be produced before each gap 21. The CMD 24 from the remote controller 12 comprises a synchronization pattern SYNC 31 of 3 ones, a hex code 13, and an even parity bit P32 that are biphase encoded. In this example, the command 14 is "light off". If the illumination device 11 receives the CMD 24 properly, the response RSP 25 comprises the same biphase encoded SYNC 31, hex code 13, and parity P32 that comprised the CMD 24.

When the illumination device 11 is not producing light, the protocol shown in FIG. 4 remains the same except that the illumination device is not outputting PWM 20 light (nor IDSYNC 30) before and after the transaction.

FIG. 4 is just one example of many possible bit timing diagrams. Instead of biphase encoding, the protocol could use any one of many well known coding schemes such 4b5b, 8b10b, or NRZ. The SYNC 31 could have a wide variety of lengths and sequences including none at all. The hex codes 13 could have more or less bits and parity P32 could be even or odd, more than one bit, or none at all. CRC codes could be used for error detection. For an illumination device 11 that is powered by light from the remote controller 12, the protocol could be substantially different. In particular, it may be necessary to transmit data one bit at a time from the illumination device 11 to the remote controller 12 with the remote controller 12 emitting light to re-charge a capacitor on the illumination device 11 for instance between bits sent from the illumination device 11. Useful transceiver techniques for so doing are described in U.S. patent application Ser. No. 12/360,467 filed Jan. 27, 2009 by David J. Knapp and entitled "Fault Tolerant Network Utilizing Bi-Directional Point-to-Point Communications Links Between Nodes," and in U.S. Provisional Application No. 61/094,595 filed Sep. 5, 2008 by David J. Knapp and entitled "Optical Communication Device, Method and System," and in U.S. patent application Ser. No. 12/584,143, filed Sep. 1, 2009 by David J. Knapp and entitled "Optical Communication Device, Method and System," each of which is hereby incorporated by reference in its entirety.

Figure 5:
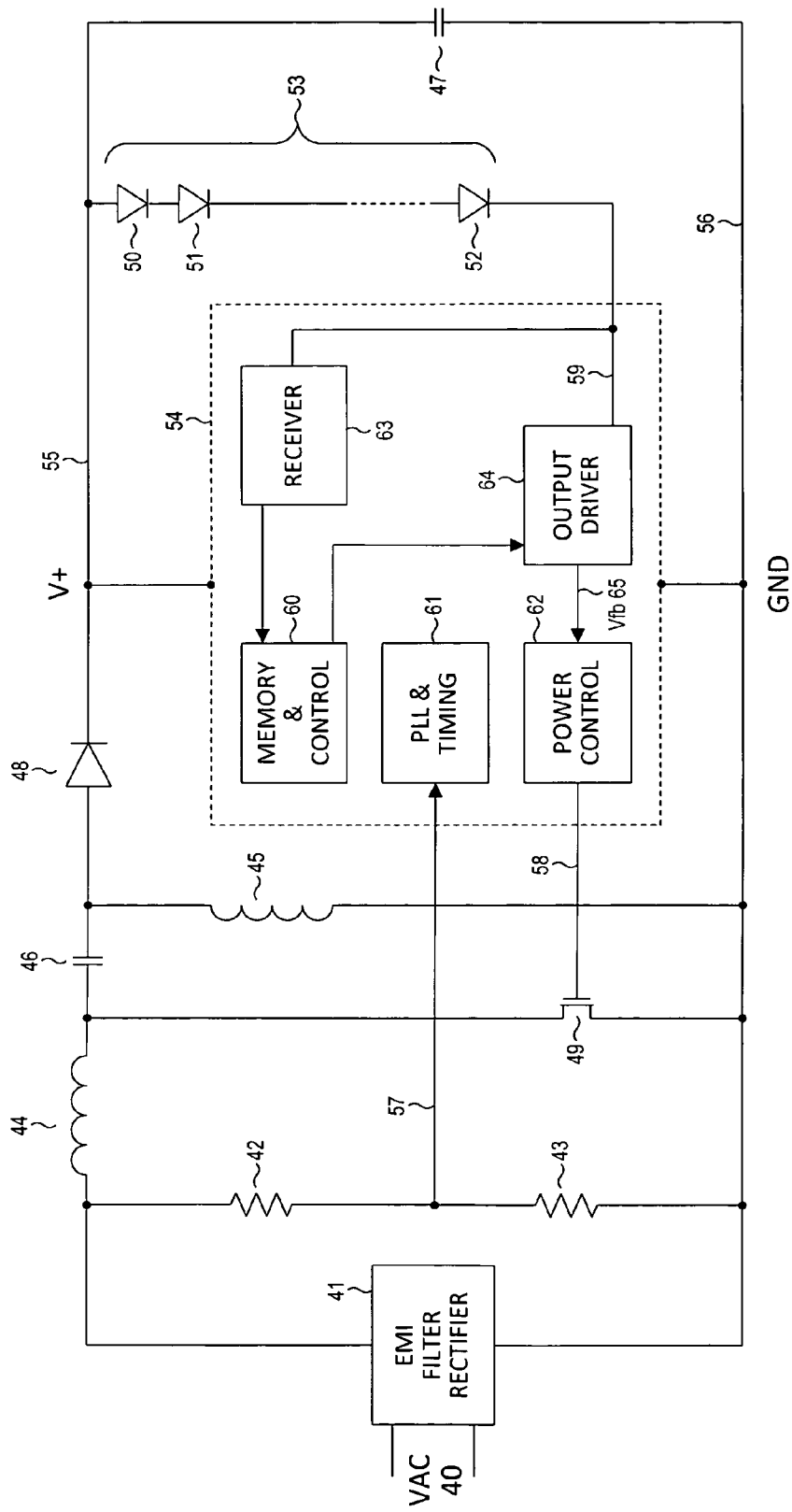
FIG. 5 is an exemplary illumination device block diagram, according to one embodiment.

FIG. 5 is an example block diagram for an exemplary illumination device 11 that comprises an. EMI filter and rectifier 41, an AC to DC converter, a voltage divider, an integrated circuit IC 54, and the LED chain 53. The EMI filter and rectifier 41 produces a full wave rectified version of the AC mains VAC 40, and minimizes both transient disturbances on the mains from affecting the rectified power, and switching noise in the illumination device 11 from affecting the mains. The voltage divider comprises resistors R 42 and R 43 and produces signal S 57 that is a reduced voltage version of the rectified mains signal for IC 54. The AC to DC converter includes inductors 44 and 45 (also referred to herein as inductors L 44 and L 45), capacitors 46 and 47 (also "capacitors C 46 and C 47"), diode 48 (also "diode D 48"), the N-channel switch transistor 49 (also "switch N 49"), and the power controller 62 on integrated circuit 54 (IC. 54). This example shows LED chain 53 comprising of LED 50, LED 51, and LEDn 52, with the dashed line between LED 52 and LEDn 53 indicating that LED chain 53 can include many LEDs. This architecture is typical for monochrome light or white light produced by blue LEDs with a phosphor coating. A multi-color illumination device typically would have separate LED chains for each color.

IC 54 includes memory and control 60, PLL and timing 61, power control 62, receiver 63, and output driver 64. Memory and control 60 includes non-volatile memory for storing configuration information, such as enabling the timer or photo-sensor, and volatile (or non-volatile) memory for settings such as dimming. Memory and control 60 also includes logic that manages the transfer of data with the remote controller 12, produces the pulse width modulated (PWM) LED drive signal S 59, and implements the timers and state machines that control the overall function of IC 54 and the illumination device 11.

PLL and timing 61 includes a phase locked loop that produces a high frequency clock that is phase locked to S 57 when the illumination device is powered. The voltage divider comprising of R 42 and R 43 provides a low voltage version of the rectified mains voltage S 57 that does not exceed the voltage rating of IC 54 and that the PLL locks to. All other circuitry on IC 54 is synchronized to the PLL and timing 61 outputs (not shown).

PLL and timing 61 enables the illumination device 11 to maintain a precise time base for time of day timer functionality by locking to the mains frequency. Likewise, gap period 22 and gap time 23 can be precisely aligned to VAC 40 timing. Such timing could enable multiple illumination devices 11 to synchronize and communicate directly between each other with light. For example, multiple illumination devices (i.e., "IDs") can sync to each other by first looking for GAPS (e.g., gaps 21) just before producing light. If proper GAPs are found, the illumination device syncs to them. If no gaps are found, there is nothing to sync to and the illumination device effectively becomes a timing master that other illumination devices lock to when turned on. Such an illumination device preferably should also be able to detect if sync is lost and to re-lock. It is further noted that additional embodiments for illumination devices and systems as well as for visible light communication systems and methods are described in U.S. Provisional Patent Application No. 61/336,242, filed Jan. 19, 2010 by David J. Knapp and entitled "Illumination Devices and Related Systems and Methods," and U.S. Provisional Patent Application No. 61/339,273, filed Mar. 2, 2010 by David J. Knapp, et al., and entitled "Systems and Methods for Visible Light Communication," each of which is hereby incorporated by reference in its entirety. It is further noted that display related systems and methods, display calibration systems and methods, and LED calibration systems and methods are described in U.S. Provisional Patent Application No. 61/273,518, filed Aug. 5, 2009 by David J. Knapp and entitled "Display and Optical Pointer Systems and Related Methods," and U.S. Provisional Patent Application No. 61/273,536, filed Aug. 5, 2009 by David J. Knapp and entitled "Display Calibration Systems and Related Methods," and U.S. Provisional Patent Application No. 61/277,871, filed Sep. 30, 2009 by David J. Knapp and entitled "LED Calibration Systems and Related Methods," and U.S. Provisional Patent Application No. 61/281,046, filed Nov. 12, 2009 by David J. Knapp and entitled "LED Calibration Systems and Related Methods," each of which is hereby incorporated by reference in its entirety.

When VAC 40 is turned off, capacitor C 47 can maintain power to IC 54 for some period of time. If VAC 40 is turned off and on within this time, IC 54 can remain powered. To reset the illumination device 11 to a default state, VAC 40 can be turned off and on a number of times for specified amounts of time. For instance, the reset sequence could be 3 short off and on intervals, followed by 3 longer off and on intervals, and followed finally by 3 more short off and on intervals. PLL and timing 61 monitors signal S 57, signals IC 54 to enter a low power state when signal S 57 stays low, and measures the time between short VAC 40 off and on periods. When PLL and timing 61 detects the proper VAC 40 off and on sequence, IC 54 is reset to a default state.

Power control 62, together with the external components inductors L 44 and L 45, capacitors C 46 and C 47, diode D 48, and switch N 49, and current sensing feedback from output driver 64, implement the AC-to-DC converter function. The configuration implemented is the well known Single Ended Primary Inductor Converter (SEPIC). Switch N 49 is turned on and off by power control 62 at a relatively high frequency such as 1 MHz, with the duty cycle varying to produce the desired current through LED chain 53. When switch N 49 is closed, the current from L 44 and L 45 is pulled through switch N 49 and charge stored on the capacitor C 46 provides current to LED chain 53. When switch N 49 is open, the current through inductors L 44 and L 45 flows through the diode D 48 and to LED chain 53 and C 47.

Power control 62 compares voltage feedback signal Vfb 65 from output driver 64 to an internal reference voltage to produce an error signal that adjusts the duty cycle of the control signal S 58 that is coupled to switch N 49. The signal Vfb 65 is produced by LED chain 53 current flowing through a small resistor in output driver 64 (not shown). When LED chain 53 is turned off, Vfb 65 becomes a divided down version of V+ 55, which occurs when receiving data and during the PWM dimming off times. A control loop adjusts the feedback divider to maintain V+ 55 at the same voltage as when LED chain 53 is on.

When output driver 64 turns the current to LED chain 53 on or off, large voltage transients can occur on V+ 55 before the power control 62 can adjust to the new duty cycle of signal S 58. When the LED chain 53 current is turned off, V+ 55 will go high until the duty cycle of S 58 is reduced, and when the LED chain 53 current is turned on, V+ 55 will go low until the duty cycle of S 58 is increased. To minimize such transients, power control 62 receives information from memory and control 60 in advance of when such changes will occur and adjusts S 58 duty cycle the instant such a change is needed. Just prior to the output driver 64 turning the LED chain 53 current off, power control 62 measures S 58 duty cycle and stores the result. This duty cycle is restored instantly the next time LED chain 53 current is turned off to prevent V+ 55 from spiking high. Likewise, the S 58 duty cycle is measured when the LED current is turned on, and the result is stored, and then restored to prevent V+ 55 from spiking low.

Output driver 64 turns LED chain 53 current on and off with a switch connected to ground (not shown). Current flows from V+ 55 to ground through LED chain 53 and the switch, when the switch is on, and no current flows when the switch is off. A small resistor in series with the switch produces Vfb 65 when the switch is on. When the switch is on, a control loop compares the output of a variable voltage divider from V+ 55 to Vfb 65 and adjusts the divider until the output equals Vfb 65. When the LED chain 53 current is turned off, the V+ 55 voltage divider loop is also turned off and the voltage divider remains fixed. While the LED chain 53 current is off, this divided version of V+ 55 is forwarded to power control 62 through Vfb 65.

Receiver 63 can receive data from the remote controller 12, when the LED chain 53 current is turned off by output driver 64. Modulated light from remote controller 12 is converted to a voltage signal S 59 by LED chain 53, which operates in photo-voltaic mode as in a solar panel. Receiver 63 high pass filters S 59 to block the DC content from ambient light and to cancel the low bandwidth of the photo-voltaic LED chain 53. Such bandwidth typically supports up to 1 k bits per second (1 kbps), but with the proper equalization filter the data rate can be increased by 10 times or more. To support the protocol in FIGS. 3 and 4, 2 kbps are needed. Receiver 63 comprises an A/D converter and a digital filter to equalize signal S 59. Timing recovery is not needed since the data is sent from the remote controller 12 synchronously to the AC mains frequency that IC 54 is locked to. The output of the digital filter is simply sampled at the appropriate times.

When the illumination device 11 is not producing light, the remote controller 12 detects the absence of gaps 21. Since the remote controller 12 is not synchronized to the gaps 21 from the illumination device 11, and since the remote controller 12 is battery powered, data from the remote controller 12 is asynchronous to the timing in the illumination device 11. Provided the remote controller 12 has a precise oscillator, such as a quartz crystal, the remote controller 12 and the illumination device reference clocks will typically be within a couple hundred parts per million of each other. The illumination device 11 resets a timer clocked at high frequency on the falling edge of the third SYNC 31 pulse and uses this timer to sample received data and produce transmitted data. The drift between the two reference clocks over the 16 msec period of one transfer is insignificant.

The illumination device 11 measures ambient light during gaps 21, and also when the illumination device 11 is not producing light, by measuring the average voltage of signal S 59 with the A/D converter in receiver 63. The A/D converter should be architected to have small DC errors, such as the well known chopper stabilization architecture, to measure very low light levels.

FIG. 5 is just one example of many possible illumination device 11 block diagrams. For example, an illumination device 11 architecture for multi-colored light could comprise of an LED chain 53 and output driver 64 for each component color. Example color combinations could comprise of red, green, and blue, or of red, yellow, green, and blue, or of red and white. During gaps 21, and also when the illumination device 11 is not producing light, the lower light frequency LEDs can measure the light intensity of each other and of the higher light frequency LEDs. For instance, in a red and white illumination device, during gaps 21 for instance, the white LED chain could produce light and the red LED chain could be connected to the receiver and could measure the light power. If the red LEDs are organized in two separate chains with separate output drivers, during gaps 21 for instance, one red LED chain could measure the light power of the other. By measuring the light power from each LED chain, the illumination device could adjust the current to the different LED chains to maintain a specific color point for instance over LED variations, temperature variations, and LED lifetime. A single receiver 63 could be shared and connected at different times to different LED chains, or multiple receivers 63 could be implemented.

In another example, illumination device 11 can be powered by the remote controller 12 during configuration The receiver 63 could be powered by an LED chain receiving modulated light and could store configuration information in the non-volatile memory included within memory and control 60. The average voltage induced across the LED chain by light is typically significantly lower than the voltage necessary to produce light from the same LED chain. The induced voltage could be stored across capacitor C 47 and a smaller segment of the LED chain 53 could be connected to output driver 64 to emit responses to the remote controller 12. The communication protocol to configure an illumination device 11 when not powered could be different from FIG. 3 to enable capacitor C 47 to be re-charged after each emitted light pulse. Useful techniques for so doing are described in the aforementioned U.S. application Ser. No. 12/360,467 and the aforementioned U.S. Provisional Application No. 61/094,595.

Figure 6:
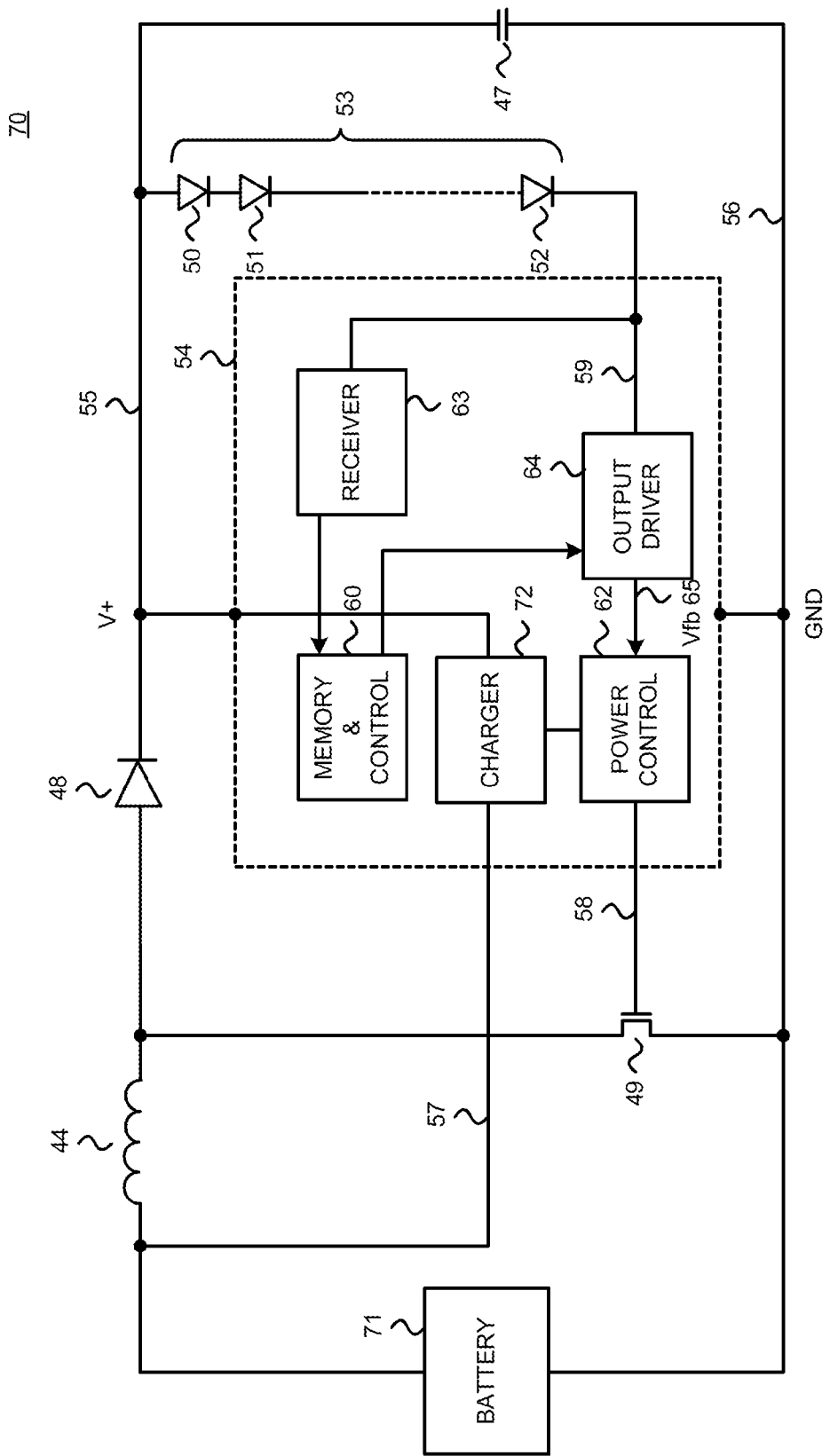
FIG. 6 is another exemplary illumination device block diagram, according to another embodiment.

The block diagram for an illumination device 70 that is powered by a battery 71 (instead of the AC mains 40) would have a battery 71 and potentially a different type of switching power supply such as the well known buck, boost, boost buck, or flyback. With a re-chargeable battery, ambient light or sunlight incident on the LEDs 53 could produce power to re-charge the battery 71. A block diagram for such an illumination device 70 is shown in FIG. 6 as having a power control 62 that manages the battery charger 72. An illumination device 11 powered by the AC mains could also have any of a wide variety of different AC-DC converters, such as the boost buck or flyback. Such an illumination device could also have a back up re-chargeable battery (as shown in FIG. 6) that enables the illumination device to maintain the time of day counter when power goes off. The timing for the illumination device 11 could also be based on a local crystal oscillator instead the mains frequency for instance.

As a further example, the block diagram for an illumination device that uses a silicon photodiode instead of LEDs for instance for receiving data would have the receiver 63 connected to the photodiode instead of LED chain 53. Such architectures would be particularly useful for illumination devices that only use phosphor coated white LEDs that do not operate well in photo-voltaic mode. The silicon photodiode could receive commands 24 from the remote controller 12, measure ambient light, and measure emitted light from the LED chain.

Multiple illumination devices could also communicate with each other. In this example, an illumination device 11 could execute a protocol to synchronize to other illumination devices and to arbitrate for transmission bandwidth. When turned on, an illumination device 11 could monitor the ambient light, search for gaps 21 with the proper gap period 22 and gap time 23, and synchronize to the gaps 21 if found. If all the illumination devices are connected to the AC mains, then very precise synchronization is possible. Illumination devices could arbitrate for bandwidth according any one of many well known arbitration protocols. For instance, if two illumination devices transmit at the same time, both illumination devices detect the collision and wait a random amount of time before trying to communicate again. As another possibility, a CMD 24 could include a priority code that indicates in the case of a collision, which illumination device stops transmitting.

As used herein, an illumination device is assumed to produce a general light, usually of a human-perceivable nature, but possibly infrared or some other wavelength. An illumination device enabled to produce light (i.e., "turned on") may be thought of as being set to an "on-state" (i.e., having its illumination state set to an on-state), even though, as described above, there may be very short periods of time during which the light source is momentarily turned "off" and is not actually emitting light, such as during the gaps, and during the off-times in a PWM signal. The on-state and off-state of the illumination device should be clear in the context described above and not confused with the on and off status of the actual light source.

An illumination device may be set to an on-state or off-state by any of several events, such as application/ removal of power to the illumination device (such as by energizing the light socket into which the illumination device is inserted), by a timer event, by ambient light control, and by a remote command.

Exemplary block diagrams are depicted herein. However, other block partitionings of an illumination device may be provided. As used herein, an illumination device attribute may represent an operational state or a configuration parameter of the illumination device. Examples include the illumination state, timer settings, delay settings, color settings for each of one or more light sources within the illumination device, photosensing mode settings, dimmer settings, time-of-day, etc.

While the invention is susceptible to various modifications and alternative forms, specific embodiments thereof are shown and described by way of example. It should be understood, however, that the drawings and detailed description thereto are not intended to limit the invention to the particular form disclosed.

What is claimed is:

1. An illumination device comprising:
  a light source configured to provide illumination when the illumination device is set in an on-state;

a light control circuit configured to control the light source responsive to incident light originating outside the illumination device from an external device configured to communicate with the illumination device, wherein the light control circuit is configured to control the light source by:
  periodically and momentarily turning the light source off at certain times when the illumination device is set in the on-state to produce periodic gaps in the illumination, wherein each said periodic gap is produced by the illumination device at the conclusion of east one synchronization pulse;
  configuring the light source to detect the incident light from the external device during the periodic gaps and when the illumination device is set to an off-state, during which the illumination device enters a low power state and is not enabled to produce illumination; and
  responding to an optically modulated command conveyed within the incident light by the external device in synchronization with the at least one synchronization pulse.

2. The illumination device as recited in claim 1 wherein:
the light control circuit is responsive to the incident light during the certain times when the light source is momentarily turned off and when the illumination device is set to the off-state.

3. The illumination device as recited in claim 1 wherein:
said the light control circuit comprises a receiver block configured to demodulate the incident light to detect the optically modulated command conveyed within the incident light by the external device; and
said the receiver block is responsive to the incident light during the certain times when the light source is momentarily turned off and when the illumination device is set to the off-state.

4. The illumination device as recited in claim 1 wherein:
the light control circuit is further responsive to incident ambient light during the certain times when the light source is turned off, and wherein the light control circuit is further configured to control the light source responsive to a level of ambient light received by the illumination device.

5. The illumination device as recited in claim 1 wherein:
the light source comprises a light-emitting-diode (LED) device; and
the LED device also functions, at times, as a light sensor for the light control circuit.

6. The illumination device as recited in claim 1 further comprising a light sensor coupled to the light control circuit, said light sensor being distinct from said light source.

7. The illumination device as recited in claim 1 wherein:
the light control circuit further comprises a timer block configured to provide temporal control of the illumination device.

8. The illumination device as recited in claim 7 wherein:
the timer block cooperates to change an illumination state of the illumination device at one or more prescribed times.

9. The illumination device as recited in claim 7 wherein:
the timer block cooperates to change an illumination state of the illumination device after a controllable delay after a particular event.

10. The illumination device as recited in claim 7 wherein:
the timer block cooperates to change an illumination state of the illumination device from the on-state to an off-state after a particular delay after being set in the on-state.

11. The illumination device as recited in claim 1 further comprising:
a housing including an industry-standard base, thereby forming a backward-compatible device for use in industry-standard light sockets.

12. The illumination device as recited in claim 1 wherein, other than during the certain times, the light control circuit is configured to pulse-width-modulate the light source when the illumination device is set in the on-state.

13. The illumination device as recited in claim 12 wherein the light control circuit, in response to optically modulated command, is configured to vary the pulse-width-modulation of the light source to achieve a dimming capability.

14. The illumination device as recited in claim 1 wherein, before each of the certain times, the light control circuit is configured to modulate the light source with the at least one synchronization pulse that is detectable by the external device.

15. The illumination device as recited in claim 14 wherein the at least one synchronization pulse comprises a single pulse having a width greater than a minimum width pulse that is detectable by the external device.

16. The illumination device as recited in 1 wherein the light control circuit is configured to control the light source to communicate with the external device using light.

17. The illumination device as recited in 16 wherein the external device comprises a second illumination device.

18. The illumination device as recited in 16 wherein the external device comprises a remote controller.

19. The illumination device as recited in 1 wherein during the certain times, the light source is momentarily turned off for a duration of time that a human eye cannot perceive.

20. A method for operating an illumination device comprising a light source, wherein when the illumination device is set in an on-state, the method comprises:
  engaging the light source at first times to provide pulse-width-modulated (PWM) illumination at a modulation frequency;
  periodically and momentarily turning the light source off at second times to produce periodic gaps in the PWM illumination at a frequency less than the modulation frequency of the PWM illumination;
  engaging the light source during said periodic gaps for detecting incident light originating from outside the illumination device , wherein the incident light comprises an optically modulated data command, which is conveyed by an external device;
  controlling the illumination device responsive to the incident light detected by the light source, wherein the controlling step comprises:
    demodulating the incident light to decode the optically modulated data command conveyed by the external device; and
    changing an attribute of the illumination device in response to the data command decoded from the incident light; and
  engaging the light source during third times for transmitting a response to the external device after receiving the data command.

21. The method as recited in claim 20 further comprising:
powering the illumination device using an AC voltage source; and synchronizing the periodic gaps to a frequency of the AC voltage source.

22. The method as recited in claim 20 wherein the light source comprises a light emitting diode (LED).

23. The method as recited in claim 20 further comprising resetting the attribute by power cycling the illumination device in a prescribed sequence.

24. The method as recited in claim 20 wherein the attribute comprises a color adjustment setting of one or more light sources included within the illumination device.

25. The method as recited in claim 20 wherein the attribute comprises a change in illumination state after a controllable time delay after a particular event.

26. The method as recited in claim 25 wherein the change in illumination state comprises setting the illumination device to an off-state, and the particular event comprises said illumination device being set to the on-state by action of a user, to thereby achieve an automatic turn-off delay of the illumination device after being turned on.

27. The method as recited in claim 25 wherein the change in illumination state comprises setting the illumination device to an off-state, and the particular event comprises being set to the on-state by a particular level of ambient light received by the illumination device, to thereby achieve an automatic turn-off delay of the illumination device after being turned on.

28. The method as recited in claim 20 wherein:
the incident light originating from outside of the illumination device further comprises ambient light; and
the controlling step further comprises adjusting a brightness of the illumination device responsive to a detected amount of the ambient light.

29. The method as recited in claim 20 further comprising:
generating power from incident light received by the light source when the illumination device is set in an off state to power the illumination device or charge a battery.

30. The method as recited in claim 20 further comprising:
synchronizing the optically modulated data command to the periodic gaps produced in the illumination during said second times when the light source is momentarily turned off.

31. The method as recited in 20 wherein the incident light originating from outside of the illumination device comprises light from a second illumination device.

32. The method as recited in claim 20 wherein the incident light originating from outside of the illumination device comprises light from a remote controller.

33. The method as recited in claim 20 wherein said controlling step comprises controlling said light source to communicate with the external device.

34. The method as recited in 33 wherein the external device comprises a second illumination device.

35. The method as recited in 33 wherein the external device comprises a remote controller.

36. The method as recited in 20 wherein during the second times the light source is turned off momentarily for a duration of time that a human eye cannot perceive.

37. The method as recited in claim 20, wherein the light source comprises a first LED, and wherein the method further comprises using the first LED to detect light during said second times when the first LED is not providing illumination.

38. The method as recited in claim 37 wherein the using step comprises using the first LED to detect light emitted from a second LED included within the illumination device.

39. The method as recited in claim 38 further comprising adjusting a color of light produced by the illumination device based on the light emitted from the second LED and detected by the first LED.

40. The method as recited in claim 39 wherein the adjusting step comprises adjusting light produced by the first LED, the second LED, or both in order to adjust the color of light produced by the illumination device.

41. An illumination device system, comprising:
an illumination device comprising:
a light source configured to provide illumination when the illumination device is set in an on-state;
a light control circuit configured to control the light source, so as to provide the illumination during first times, produce periodic gaps in the illumination during second times by periodically and momentarily turning the light source off, and change an attribute of the illumination device in response to incident light received by the light source, wherein the attribute comprises a change in illumination state after a controllable time delay after a particular event, wherein before each of periodic gaps, the light control circuit is further configured to modulate the illumination provided by the light source with at least one synchronization pulse that is detectable by the remote control device; and
a remote control device configured to convey optically modulated data commands to the light source during the periodic gaps and when the illumination device is set to an off-state, during which the illumination device enters a low power state and is not enabled to produce illumination.

42. The illumination device system as recited in claim 41, wherein the remote control circuit is configured to use the at least one synchronization pulse to synchronize the optically modulated data commands to the periodic gaps.

43. The illumination device system as recited in claim 41, wherein the light control circuit is further configured to:
demodulate the incident light to decode the optically modulated data command conveyed by the remote control device; and
change an attribute of the illumination device in response to the data command decoded from the incident light.

44. The illumination device system as recited in claim 43, wherein in response to the data command decoded from the incident light, the light control circuit is configured to change the attribute of the illumination device by setting the illumination device to the on-state, setting the illumination device to the off-state, changing a brightness of light produced by the illumination device, or adjusting a color of light produced by the illumination device.

45. The illumination device system as recited in claim 41, wherein the light source is configured to receive incident light during the periodic gaps and when the illumination device is set to an off-state.

46. The illumination device system as recited in claim 45, wherein the incident light is received from another light source within the illumination device, a light source within another illumination device within the illumination device system or ambient light.

47. The illumination device system as recited in claim 45, wherein in response to the incident light received by the light source, the light control circuit is configured to change the attribute of the illumination device by setting the illumination device to the on-state, setting the illumination device to the off-state, changing a brightness of light produced by the illumination device, or adjusting a color of light produced by the illumination device.

48. The illumination device system as recited in claim 41, wherein the attribute is reset by power cycling the illumination device in a prescribed sequence.

49. An illumination device comprising:
   a light source configured to provide pulse-width-modulated (PWM) illumination at a modulation frequency when the illumination device is set in an on-state; and
   a light control circuit configured to control the light source responsive to incident light originating outside the illumination device from a second illumination device, which is configured to communicate with the illumination device using visible light, wherein the light control circuit is configured to turn off the light source momentarily at certain times to produce periodic gaps in the PWM illumination when the illumination device is set in the on-state, so that the light source can detect the incident light from the second illumination device during the periodic gaps, and wherein the periodic gaps are produced at a frequency less than the modulation frequency of the PWM illumination.

50. The illumination device as recited in claim 49 further comprising:
   a power supply block configured for storing a voltage induced across the light source in response to receiving the incident light.

51. The illumination device as recited in claim 50 wherein the power supply block is configured to charge a battery included within the illumination device.

52. The illumination device as recited in claim 50 wherein the power supply block is configured to operate the light control circuit, when powered solely by incident light conveying optically modulated commands, to receive and decode an optically modulated command, and to configure the illumination device accordingly.

53. A method for operating an illumination device comprising a light source, wherein when the illumination device is set in an on-state, the method comprises:
   engaging the light source at first times to provide pulse-width-modulated (PWM) illumination at a modulation frequency;
   periodically and momentarily turning the light source off at second times to produce periodic gaps in the PWM illumination at a frequency less than the modulation frequency of the PWM illumination;
   engaging the light source during said periodic gaps for detecting incident light originating from outside the illumination device, wherein the incident light comprises an optically modulated data command, which is conveyed by an external device; and
   controlling the illumination device responsive to the incident light detected by the light source, wherein the controlling step comprises:
      demodulating the incident light to decode the optically modulated data command conveyed by the external device; and
      changing an attribute of the illumination device in response to the data command decoded from the incident light, wherein the attribute comprises a change in illumination state after a controllable time delay after a particular event.

54. The illumination device as recited in claim 1 further comprising a power supply block powered by an AC voltage source, wherein the power supply block is configured to provide power to the light control circuit and the light source, and wherein the certain times when the light source is turned off is synchronized to the AC voltage source.

* * * * *